(12) United States Patent
Han

(10) Patent No.: US 7,301,762 B2
(45) Date of Patent: Nov. 27, 2007

(54) COMPUTER ENCLOSURE WITH STATIC PROTECTION DEVICE

(75) Inventor: Shao-Bo Han, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 367 days.

(21) Appl. No.: 10/991,103

(22) Filed: Nov. 17, 2004

(65) Prior Publication Data

US 2005/0128694 A1 Jun. 16, 2005

(30) Foreign Application Priority Data

Dec. 16, 2003 (TW) .............................. 92222020 U

(51) Int. Cl.
*H05K 9/00* (2006.01)
*H05K 7/10* (2006.01)
*H05K 5/02* (2006.01)

(52) U.S. Cl. ..................... 361/685; 361/818; 361/799; 361/800

(58) Field of Classification Search ............... 361/683, 361/685, 799, 800, 818
See application file for complete search history.

(56) References Cited

U.S. PATENT DOCUMENTS 5,142,447 A * 8/1992 Cooke et al. ............... 361/685
5,227,954 A * 7/1993 Twigg ......................... 361/685
5,262,923 A * 11/1993 Batta et al. .................. 361/685
5,510,955 A * 4/1996 Taesang ...................... 361/685
5,654,873 A * 8/1997 Smithson et al. ........... 361/685
6,318,679 B1 * 11/2001 Yang et al. ................. 248/27.1
6,407,913 B1 * 6/2002 Peachey et al. ............. 361/685
6,590,775 B2 * 7/2003 Chen .......................... 361/725
6,614,654 B2 * 9/2003 Liu et al. .................... 361/685
2002/0052994 A1 * 5/2002 Khan et al. ................. 710/300
2004/0075981 A1 * 4/2004 Kim et al. ................... 361/687
2006/0087792 A1 * 4/2006 Ng et al. ..................... 361/152

FOREIGN PATENT DOCUMENTS

CN 02205624.6 2/2003

* cited by examiner

*Primary Examiner*—Anatoly Vortman
(74) *Attorney, Agent, or Firm*—Morris Manning Martin LLP; Tim Tingkang Xia, Esq.

(57) ABSTRACT

A computer enclosure includes a front panel, a drive bracket attached to the enclosure for receiving a data storage device therein, and a static protection device attached to the drive bracket. The drive bracket includes a recess with a plurality of catch orifices defined therein and a plurality of hooks formed thereon. The static protection device includes a main portion, and a side plate bent outwardly from the main portion. A plurality of catches is formed on the main portion engaging in the catch orifices of the drive bracket and a plurality of locking holes defined in the side plate corresponding with hooks of the drive bracket. The main portion and the side plate respectively connect with the data storage device and the front panel of the enclosure to provide a path to ground.

15 Claims, 3 Drawing Sheets

COMPUTER ENCLOSURE WITH STATIC PROTECTION DEVICE

BACKGROUND OF THE INVENTION

1. Field of Invention

The present invention relates to computer enclosures, and particularly to a computer enclosure having a static protection device for protecting internal elements of the enclosure from damage of static spark discharge.

2. Description of the Related Art

The increased utilization of large scale integration, in an ever widening array of diverse technologies, such as computers, automotive, medical, and household appliances has led to a rapidly growing demand for packaging technologies to yield packaged devices having reduced cost, improved reliability and performance, increased interconnect density, and small package size. IC components are becoming more complicated with different kinds of Very Large Scale Integrated (VLSI) techniques. As a result, the circuits are more than before vulnerable to the damaging effect of Electrostatic Discharge.

Generally, a drive bracket for receiving a data storage device in a computer enclosure is made of metal material for providing a path to ground. But, if the drive bracket is made of electrical insulation material, such as rubber, the accumulation of static charge cannot find a path to ground and may lead to extremely high voltages near an integrated circuit in the data storage device. Electrostatic discharge (ESD) has the potential to destroy an entire integrated circuit.

Thus, an improved computer enclosure which overcomes the above-mentioned problems is desired.

BRIEF SUMMARY OF THE INVENTION

Accordingly, an object of the present invention is to provide a computer enclosure which has a static protection device for protecting internal elements of the enclosure from damage of static spark discharge.

To achieve the above object, a computer enclosure of the present invention includes a front panel, a drive bracket attached to the enclosure for receiving a data storage device therein, and a static protection device attached to the drive bracket. The drive bracket includes a recess with a plurality of catch orifices defined therein and a plurality of hooks formed thereon. The static protection device includes a main portion, and a side plate bending outwardly from the main portion. A plurality of catches is formed on the main portion engaging in the catch orifices of the drive bracket and a plurality of through holes defined in the side plate corresponding with hooks of the drive bracket, the main portion and the side plate respectively connects with the data storage device and the front panel of the enclosure to drain static to the earth ground.

Other objects, advantages and novel features of the present invention will become more apparent from the following detailed description when taken in conjunction with the accompanying drawings, in which:

DETAILED DESCRIPTION OF THE INVENTION

Figure 1:
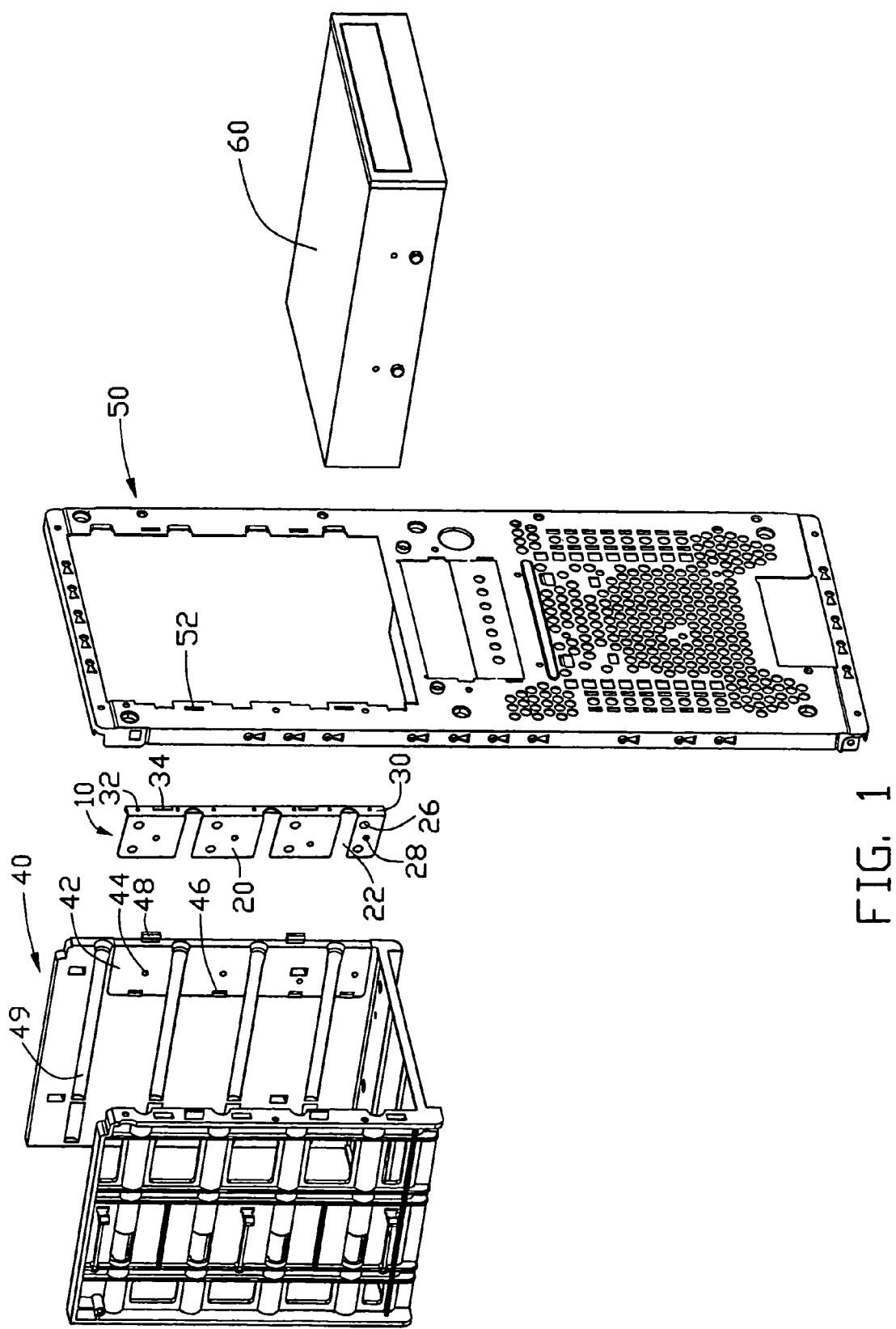
FIG. 1 is an exploded, isometric view of a computer enclosure in accordance with the present invention.
Figure 2:
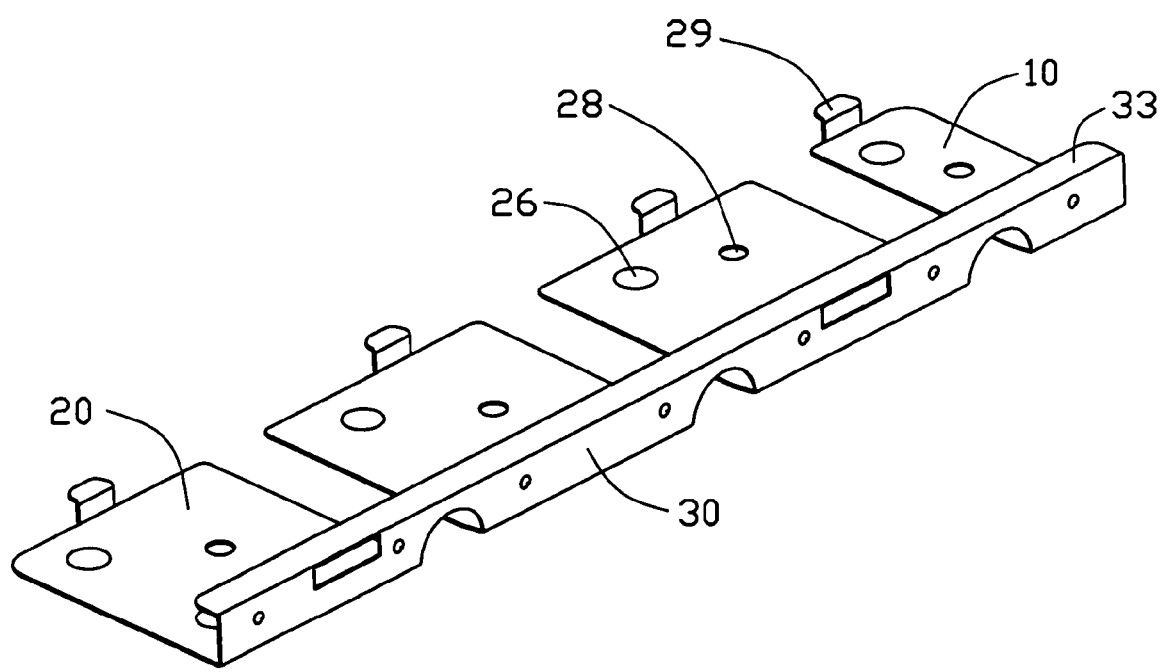
FIG. 2 is an isometric view of a static protection device of the computer enclosure in accordance with the present invention.

Referring to FIGS. 1 and 2, a computer enclosure in accordance with a preferred embodiment of the present invention comprises a static protection device 10, a drive bracket 40, and a front panel 50. The static protection device 10 is sandwiched between the drive bracket 40 and data storage devices 60. For simplification reason, only one data storage device 60 is described. The data storage device 60 electronically connects with the front panel 50 of the enclosure, so the static charge is guided out through the enclosure.

The static protection device 10 is a sheet of metal, and comprises a main portion 20, a side plate 30 bent outwardly from the main portion 20, and a rim 33 being offset inwardly from an edge of the side plate 30. A plurality of slots 22 and position holes 28 are defined in the main portion 20. A plurality of protuberances 26 is formed inwardly from the main portion 20 to abut against the data storage device 60. A plurality of L-shaped catches 29 is formed outwardly from the main portion 20 to secure the static protection device 30 to the drive bracket 40. The side plate 30 has a plurality of protuberances 32 formed thereon to abut against the front panel 50. A plurality of through holes 34 is defined in the side plate 30 to secure the static protection device 10 to the drive bracket 40.

The drive bracket 40 is made of electric insulation material, such as rubber. The drive bracket 40 defines a rectangular recess 42 corresponding to the static protection device 10. A plurality of catch orifices 46 is defined in the recess 42 corresponding with the catches 29 of the static protection device 10, and a plurality hooks 48 is formed on the foreside of the recess 42 corresponding with the through holes 34 to attach the static protection device 10. A plurality of knobs 44 is formed inwardly from the recess 42 corresponding to the position holes 28 to assist to position the static protection device to the drive bracket 40. The drive bracket 40 defines a plurality of grooves 49 in alignment with the slots 22 of the static protection device 10 for sliding of data storage devices 60.

The front panel 50 of the enclosure comprises a plurality of locking holes 52. The hooks 48 extend through the through holes 34 and the locking holes 52 to lock the static protection device 10 to the front panel 50.

Figure 3:
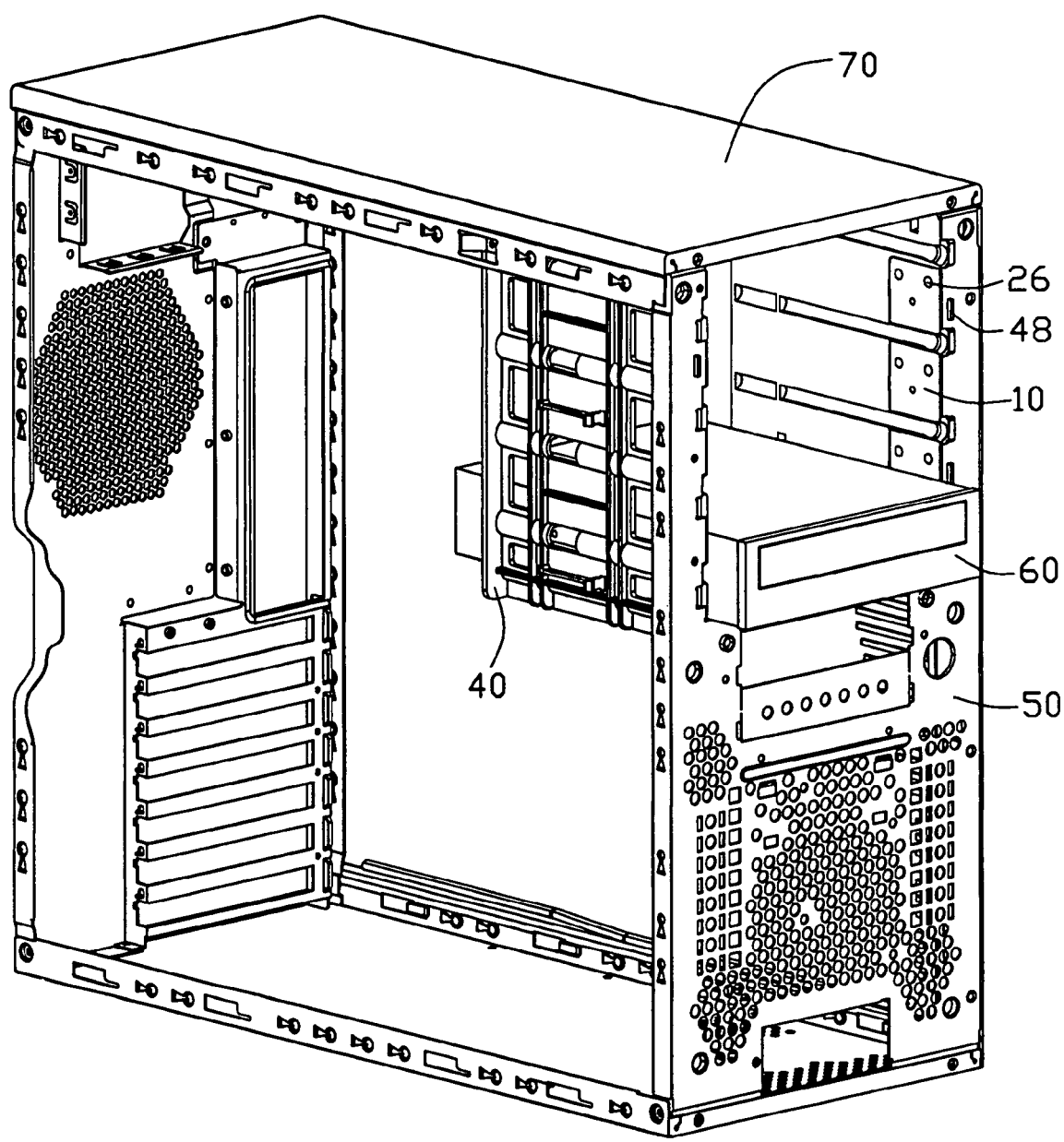
FIG. 3 is a fully assembled view of FIG. 1.

Referring to FIG. 3, in use, the catches 29 of the static protection device 10 are inserted into the catch orifices 46 of the drive bracket 40 to lock the static protection device 10 to the recess 42, and the hooks 48 extend through the through holes 34 and the locking holes 52 of the front panel to lock the static protection device 10 to the front panel 50. Then the data storage device 60 is attached in the drive bracket 40. The protuberances 26 of the static protection device 10 abut against the data storage device 60, the protuberances 32 of the side plate 30 abut against the front panel 50 of the enclosure 70. The data storage device 60 electrically connects the enclosure 70 to provide a path for static electricity to pass through the enclosure 70 to ground.

It will be understood by one skilled in the art according to the present invention, other means for the static protection device 10 to abut against the data storage device 60 and the enclosure 70 may alternatively be used, such as forming a plurality of spring tabs on the static protection device 10. Because the edges of the protuberances and spring tabs are narrow or fine, the electrical field is easily concentrated, discharged to ground.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A computer enclosure comprising:
   a front panel;
   a drive bracket attached to the enclosure adapted for receiving a data storage device, the drive bracket comprising a recess with a plurality of catch orifices defined therein and a plurality of hooks formed thereon; and
   a static protection device attached to the drive bracket, comprising a main portion, and a side plate bending outwardly from the main portion, a plurality of catches formed on the main portion engaging in the catch orifices of the drive bracket and a plurality of through holes defined in the side plate engaging with the plurality of hooks of the drive bracket, the main portion and the side plate respectively connecting with the data storage device and the front panel of the enclosure.

2. The computer enclosure as claimed in claim 1, wherein the static protection device is made of electrically conductive material.

3. The computer enclosure as claimed in claim 2, wherein the main portion and the side plate each form at least one protuberance to electrically connect the static protection device with the data storage device and the front panel.

4. The computer enclosure as claimed in claim 1, wherein a plurality of position holes is defined in the main portion, and a plurality of knobs is formed on the drive bracket corresponding to the position holes to assist with positioning the static protection device in relation to the drive bracket.

5. The computer enclosure as claimed in claim 1, wherein the front panel forms a plurality of locking holes engaging with the hooks of the drive bracket.

6. The computer enclosure as claimed in claim 1, wherein a plurality of slots is defined in the main portion, and a plurality of grooves is defined in the drive bracket in alignment with the slots of the main portion for sliding of data storage devices.

7. A computer enclosure comprising:
   a front panel;
   a drive bracket adapted for receiving a data storage device therein, comprising a receiving portion; and
   a static protection device comprising a main portion and a side plate bent from a front edge of the main portion, the main portion received in the receiving portion and sandwiched between the drive bracket and the data storage device, the side plate sandwiched between a front flange of the drive bracket and the front panel, the main portion and the side plate forming protruding portions to electrically connect with the data storage device and the front panel of the enclosure, respectively;
   wherein the drive bracket comprises a plurality of hooks formed thereon, and the side plate defines a plurality of through holes corresponding with the hooks of the drive bracket.

8. The computer enclosure as claimed in claim 7, wherein the protruding portions of the main portion and the side plate are protuberances.

9. The computer enclosure as claimed in claim 7, wherein the drive bracket comprises a plurality of catch orifices defined therein, and the main portion forms a plurality of catches engaging in the catch orifices of the drive bracket.

10. The computer enclosure as claimed in claim 7, wherein the front panel forms a plurality of locking holes engaging with the hooks of the drive bracket.

11. The computer enclosure as claimed in claim 7, wherein a plurality of slots is defined in the main portion, and a plurality of grooves is defined in the drive bracket in alignment with the slots of the main portion for sliding of data storage devices.

12. An enclosure of an electronic device comprising:
   an electrically conductive panel defining at least one locking hole;
   a drive bracket adapted for receiving a data storage device therein, the drive bracket forming at least one hook for engaging with the at least one locking hole of the panel; and
   a protection device attached to said drive bracket and comprising at least two electrically conductive portions extending therefrom to be reachable respectively to said data storage device and said panel so as to establish an electrical connection between said panel and said data storage device by means of said at least two portions of said protection device in case that said drive bracket and said data storage device achieve final installation in said enclosure;
   wherein one of said at least two portions of said protection device defines at least one through hole corresponding to said at least one hook of said drive bracket for engaging therewith.

13. The enclosure as claimed in claim 12, wherein said at least two portions of said protection device have a plurality of protuberances protruding therefrom to contribute to establishment of said electrical connection.

14. The enclosure as claimed in claim 12, wherein said at least two portions of said protection device extend perpendicularly to each other.

15. The enclosure as claimed in claim 12, wherein one of said at least two portions of said protection device is sandwiched between said panel and said drive bracket, and another of said at least two portions of said protection device is sandwiched between said data storage device and said drive bracket.

* * * * *